United States Patent
Prust et al.

(10) Patent No.: US 8,257,002 B2
(45) Date of Patent: Sep. 4, 2012

(54) METHOD FOR MACHINING WORKPIECES ON A CUTTING MACHINE TOOL

(75) Inventors: Dirk Prust, Tuttlingen (DE); Claus Eppler, Messkirch (DE)

(73) Assignee: Chiron-Werke GmbH & Co. KG, Tuttlingen (DE)

( * ) Notice: Subject to any disclaimer, the term of this patent is extended or adjusted under 35 U.S.C. 154(b) by 322 days.

(21) Appl. No.: 12/764,842

(22) Filed: Apr. 21, 2010

(65) Prior Publication Data

US 2010/0296886 A1 Nov. 25, 2010

Related U.S. Application Data

(63) Continuation of application No. PCT/EP2008/008013, filed on Sep. 23, 2008.

(30) Foreign Application Priority Data

Oct. 30, 2007 (DE) .......................... 10 2007 053 350

(51) Int. Cl.
*B23B 37/00* (2006.01)

(52) U.S. Cl. ............. 409/132; 82/904; 408/1 R; 408/17; 408/700; 451/165

(58) Field of Classification Search .................. 409/131, 409/132; 408/1 R, 8, 10–12, 17, 124, 700; 82/904; 451/121, 165; 173/117; 83/754, 83/756, 956; *B24B 1/04; B23B 37/00*
See application file for complete search history.

(56) References Cited

U.S. PATENT DOCUMENTS

| | | | | |
|---|---|---|---|---|
| 3,614,484 A | * | 10/1971 | Shoh | 310/325 |
| 3,619,671 A | * | 11/1971 | Shoh | 310/325 |
| 4,362,444 A | | 12/1982 | Watkins | |
| 5,735,646 A | * | 4/1998 | Finn | 408/3 |
| 5,911,802 A | | 6/1999 | Kimura et al. | |
| 2005/0028657 A1 | * | 2/2005 | Mitro et al. | 82/118 |
| 2006/0251480 A1 | | 11/2006 | Mann et al. | |

FOREIGN PATENT DOCUMENTS

| | | | |
|---|---|---|---|
| DE | 31 39 540 | | 6/1982 |
| DE | 197 28 268 | | 1/1998 |
| DE | 10 2005 002 460 | | 7/2006 |
| DE | 10 2006 015 038 | | 10/2007 |
| EP | 1 052 057 | | 11/2000 |
| JP | 59118306 A | * | 7/1984 |
| JP | 01199758 A | * | 8/1989 |

(Continued)

OTHER PUBLICATIONS

International Search Report for PCT/EP2008/008013, mailed on Mar. 26, 2009, 3 pages.

(Continued)

*Primary Examiner* — Daniel Howell
(74) *Attorney, Agent, or Firm* — Morrison & Foerster LLP

(57) ABSTRACT

In the case of a method for chip-removing machining of workpieces (14), in particular for making bores in workpieces (14), wherein a tool (18) is put into rotation (20) relative to the workpiece (14) and the tool (18) is moved relative to the workpiece (14) with a feed motion, the tool (18) executes an oscillating motion in the direction (z) of the feed motion relative to the workpiece (14), a settable oscillation component being imparted to the feed motion through control means.

16 Claims, 3 Drawing Sheets

FOREIGN PATENT DOCUMENTS

| | | | |
|---|---|---|---|
| JP | 05116014 A | * | 5/1993 |
| JP | 07024709 A | * | 1/1995 |
| JP | 11010420 A | * | 1/1999 |
| JP | 2000042816 A | * | 2/2000 |
| WO | WO-97/10913 | | 3/1997 |
| WO | WO-2007/113050 | | 10/2007 |

OTHER PUBLICATIONS

International Preliminary Report on Patentability for PCT/EP2008/008013, issued May 4, 2010, 6 pages.

* cited by examiner

METHOD FOR MACHINING WORKPIECES ON A CUTTING MACHINE TOOL

This is a continuation application of international patent application PCT/EP 2008/008013, filed Sep. 23, 2008, designating the United States and published in English as WO 2009/056198 A1, which claims priority to German application No. 10 2007 053 350.2, filed Oct. 30, 2007. The contents of these applications are herein incorporated by reference in their entireties.

BACKGROUND OF THE INVENTION

1. Field of the Invention

The present invention relates to a method for machining workpieces on a cutting machine tool, in particular for drilling bores into workpieces, wherein a tool is put into rotation relative to the workpiece and the tool is moved relative to the workpiece with a feed motion, the tool executing an oscillating motion in the direction of the feed motion relative to the workpiece.

2. Related Prior Art

Such a method is known, for example, from DE 10 205 002 460 A1.

In chip-removing machining of workpieces, it is necessary that particular importance be attached to the clearance of chips, as well as to the accuracy and speed of machining In this case, not only do long chips produced during cutting give rise to problems with regard to disposal, but unwanted effects also occur during machining.

These problems occur in all machining operations in which chips are produced, i.e. in particular during drilling, milling and turning. Various measures are therefore taken to break the produced chips, so that they can be cleared more easily. Short chips offer not only handling advantages, however, as they are also desirable in respect of rapid and accurate machining and good surface condition.

In the making of deep drilled holes, in particular, the produced chips can result, for example, in jamming of the tool within the drilling hole, which can result in excessive wear on the tool and, consequently, in a reduction of the service life or even in breakage of the drill. Further, in this case, likewise, long chips impair the quality of the machined surface, since grooves can be produced.

Known from DE 31 39 540 A1, for the purpose of solving these problems, is the practice of cyclically withdrawing the drill from the bore during drilling and then advancing it again into the drilling hole, in order to clear the produced chips from the drilling hole. Withdrawal removes the drill from the chip, which therefore breaks the chips, and, owing to the shorter chip length, enables the chips to be taken away more easily. Upon being advanced again, the drill has to go back into engagement with the workpiece, which can result in quality problems, there also being the risk, in the case of rapid advancing, of the drill striking on the base of the drilling hole and breaking.

In DE 10 2005 002 460 A1 mentioned at the outset, in order to avoid these problems it is proposed that an oscillating motion, the stroke of which can be set and which goes to and fro in the axial direction, be superimposed on the continuous feed motion through mechanical measures. It is thereby intended that the produced chips become broken at an early stage, so as to produce short chips that are easily cleared and cause fewer problems in machining.

The known drilling appliance is therefore provided with an oscillator housing, the bearing bushing of which cooperates, via rolling elements, with a bearing bushing of an oscillator. Owing to the two bearing bushings, there is mechanically superimposed on the continuous feed motion, which in itself is unchanged, an oscillating motion whose oscillation stroke can be set within certain ranges through variation of the inclination of the bearing bushings in relation to one another.

The arrangement in this case is such that a complete oscillation stroke is executed during respectively two full revolutions of the drill. Thus, the frequency of oscillation is always half as great as the rotational speed of the drill. In the case of a feed motion of 0.02 mm per revolution of the drill, the oscillation stroke can be set to values below 0.02 mm.

In the case of this drilling mechanism, it is disadvantageous, in addition to its complicated and therefore cost-intensive and susceptible structure, that the manual setting of the oscillation stroke is difficult and time-consuming, and consequently less flexible. Further, owing to the fixedly predefined relationship between rotational speed and oscillation frequency, and to the fact that in each case the oscillation stroke must be fixedly set in advance for a machining operation, the known drilling mechanism does not fulfill all requirements. This applies, in particular, when machining is to be performed on workpieces of materials from which chips are not easily removed. It is therefore necessary for specially adapted drilling mechanisms to be used in each case for differing machining tasks.

It is known from DE 10 2006 015 038 A1 and DE 197 28 268 A1 to set a process parameter to a basic value and to vary the process parameter around this basic value when working a rotating workpiece with a tool. These known methods are not encountered with the problems associated with long chips and the respective removal thereof.

SUMMARY OF THE INVENTION

In view of the above, it is an object of the present invention to improve the method mentioned at the outset in such a way that it works reliably and can easily be adapted to differing machining tasks.

In the case of the method mentioned at the outset, this object is achieved, according to the invention, in that a settable oscillation component is imparted to the feed motion through control means.

In this way, the object underlying the invention is achieved in full.

This is because the inventors of the present application have perceived that a mechanical superimposition of the oscillating motion always has associated disadvantages that cannot be remedied even with a large structural resource application. According to the perception of the inventors, however, the control and drive systems of modern machine tools make it possible, contrary to expectation, for an oscillating component to be imparted to the feed motion itself, such that a constant feed is effected in the average over time, while the feed motion is varied around this mean value in a controlled manner with high time resolution.

In the context of the present invention, an "oscillating motion" is understood to be not exclusively a regular or uniform motion, although such a motion is preferred. Also possible, however, are other forms of motion in which the superimposed motion has, for example in the feed direction, a variation over time and/or acceleration characteristics or speed characteristics that differs or differ from those in the "return stroke" contrary to the feed direction. Rather, the user has a free choice of waveform parameters for the oscillating motion, thus also being able to vary these parameters multiply in the course of a machining operation.

In the case of this method, there is therefore no need for any additional oscillation mechanism or any superordinated further machining axis; rather, use is made of the feed axis present in any case, to the feed motion of which a control means directed oscillation component is imparted according to the invention.

It is thereby also possible to eliminate a further problem that exists in the case of the mechanical superimposition of an oscillating motion. As mentioned at the outset, in the case of mechanical superimposition the oscillation stroke cannot be varied during a machining task. Thus, in the drilling of deep holes, machining commences with a long feed motion, which is gradually increased. Consequently, the mechanically predetermined oscillation stroke is either too great in the starting phase of the deep-hole drilling, such that the drill comes out of the chip during the return stroke, which impairs the machining quality and the service life of the tool, or the oscillation stroke is too small in the end phase, such that the return stroke is not sufficient to thin the chip to the extent that it breaks in a defined manner.

With use of the new method, the oscillation stroke can now be optimally adapted to the feed motion during the machining operation. At the same time, any waveforms can also be imparted to the oscillation component of the feed motion through control means. Continuous, in particular sinusoidal, waveforms are preferred in this case.

In other words, all parameters of the oscillation component can be varied in a free and flexible manner at any time, such that it is possible for the oscillation component to be adaptively matched to the current profile of the machining operation. In this way, it is possible for the first time, in the case of all conceivable machining tasks, to reliably prevent the feed rate from becoming zero or negative. In other words, the tool remains in contact with the chip during the entire machining operation.

The fact that such a variation of the feed motion is possible with a single feed axis was not to be expected. Experiments by the applicant have shown, however, that such complex motional sequences of the feed axis are rendered possible, in a reproducible manner, by the currently available drive systems. Thus, the new method can be implemented, for example, on a machine tool of the applicant, which machine tool is equipped with a Siemens 840D-model control system and a drive system from the Siemodrive 611D product range.

Unexpectedly, it was found in this case that, compared with a control system without superimposed oscillating motion, the mean feed rate can be increased with the same service life of the tool and the same machining quality. In a series of experiments, it was even possible to almost double the mean feed rate in deep drilling.

The control software, and the feedback controllers and actuators of modern machine tools allow the waveform of the oscillation component to have a continuous characteristic, i.e. without jerky motional components that are unavoidable in the case of mechanical superimposition, where they have a negative effect upon the service life of the tool and upon the machining quality. According to the experiments by the applicant, the rapid, high-resolution control of the motor current and the rapid variation of the motor current that are required for this purpose can be realized in a sustained manner without exceeding of the load limits that are to be observed.

Although the new method can be performed, in principle, on those numerically controlled drilling and milling mechanisms in which automatic feed of a tool or workpiece is effected, it is nevertheless particularly preferred if the method is performed on a CNC-controlled machine tool in which the tool is clamped into a work spindle and the workpiece is clamped into a device, the work spindle and the device being moved relative to one another in a program-controlled manner, at least in the direction of the feed motion.

In the case of this measure, it is advantageous that an existing machine tool can be used more efficiently for deephole drilling, in that the control system is programmed such that the new method can be performed.

It is preferred in this case if the oscillation parameters are set independently of the rotational speed of the tool.

It is advantageous in this case that the new method can be adapted flexibly to all machining tasks, all parameters, such as oscillation frequency and oscillation stroke, and the waveform of the oscillation component being freely selectable and not coupled to the rotational speed in an invariable manner Conversely, however, both the feed and the rotational speed of the tool can thereby be varied freely in the course of machining, without this having negative effects upon the forced chip breakage.

Further embodiments of the invention can be found in the dependent claims.

It is particularly preferred, if bores are drilled into workpieces, and if the oscillation stroke (k) of the oscillation component (a(t)) is set in dependence on the feed (f) of the tool.

It was not expected, in view of the prior art mentioned above, that in a method for drilling preferably deep bores the feed of the drill can be used to set the oscillation stroke in an adaptive way. By this, the problem of chip removal from the bore, most important with drilling of deep bores, can be solved, and the bores produced such show a good surface quality.

Further advantages are disclosed by the description and the appended drawing.

It is understood that the aforementioned features and those yet to be explained in the following can be used, not only in the respectively stated combinations, but also in other combinations or singly, without departure from the scope of the present invention.

BRIEF DESCRIPTION OF THE DRAWINGS

Embodiments of the invention are represented in the drawing and are explained more fully in the following description. In the drawing.

DESCRIPTION OF A PREFERRED EMBODIMENT

Figure 1:
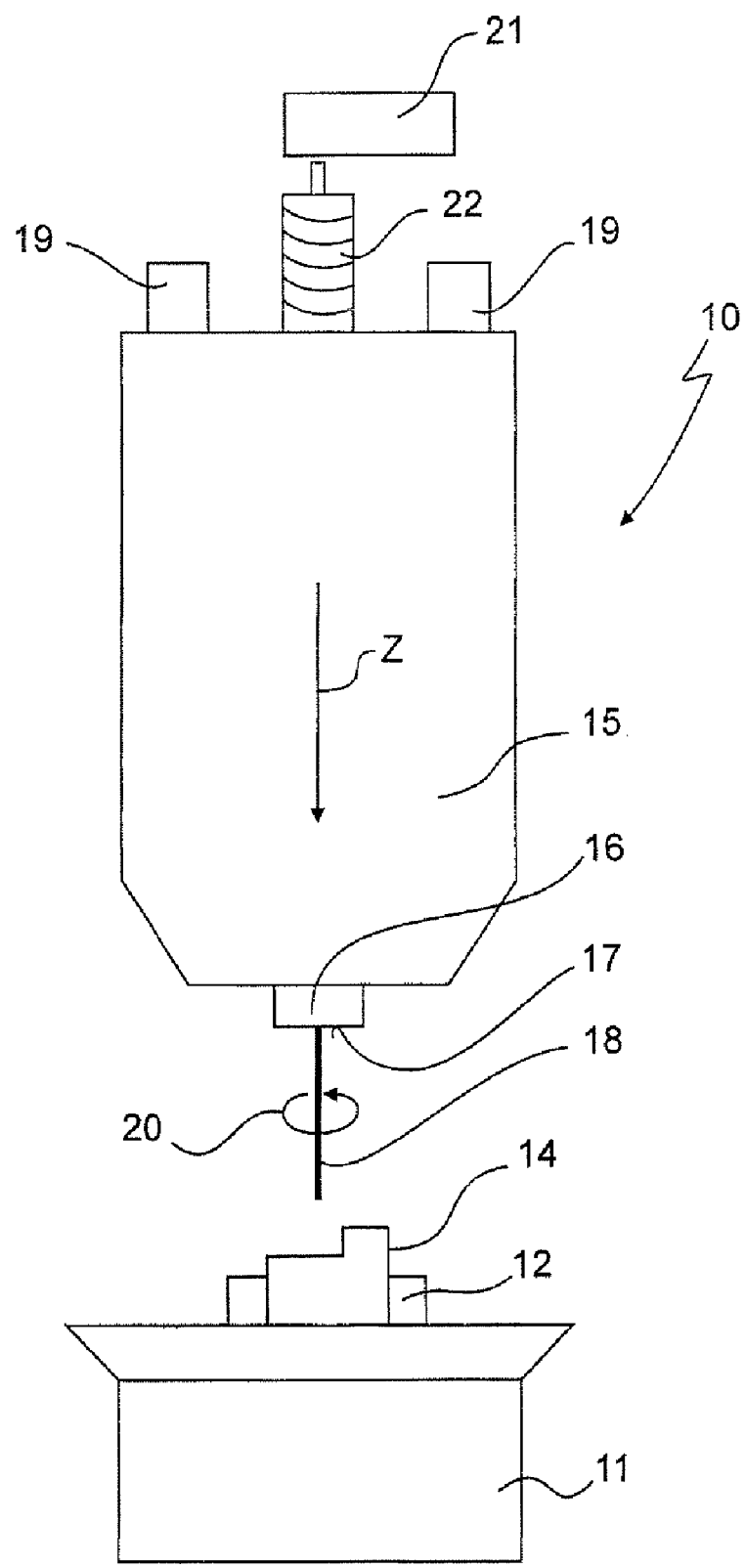
FIG. 1 shows a schematic representation of a machine tool on which the new method is performed.

Shown schematically in FIG. 1 is a machine tool, which is denoted by 10 and which, in the present embodiment, is a CNC-controlled vertical moving-column machine.

The machine tool 10 has a workpiece table 11 having a device 12 into which is clamped a workpiece 14 that is to be machined. Also provided is a spindle head 15, in which there is mounted, in a rotationally driven manner, a work spindle 16 that, in a known manner, at its lower end face 17 carries a tool 18, which in this case is a drilling tool.

The spindle head and the device can be moved relative to each other in the three coordinates of space in a manner likewise known per se. For this purpose, in the embodiment shown, the spindle head is mounted on guide rails 19, along which it can execute a feed motion in the direction of the feed axis, which is the z-axis in this case. This feed motion is effected by a motor 21, which, in a manner known per se, drives a ball screw 22 that moves the spindle head 15 along the guide rails 19.

When the tool 18 is put into rotation by the work spindle 16 at a rotational speed n, as indicated by an arrow 20, and is moved along the z-axis, relative to the workpiece 14, at a feed rate s(t), a bore can thereby be made in the workpiece 14.

Figure 2:
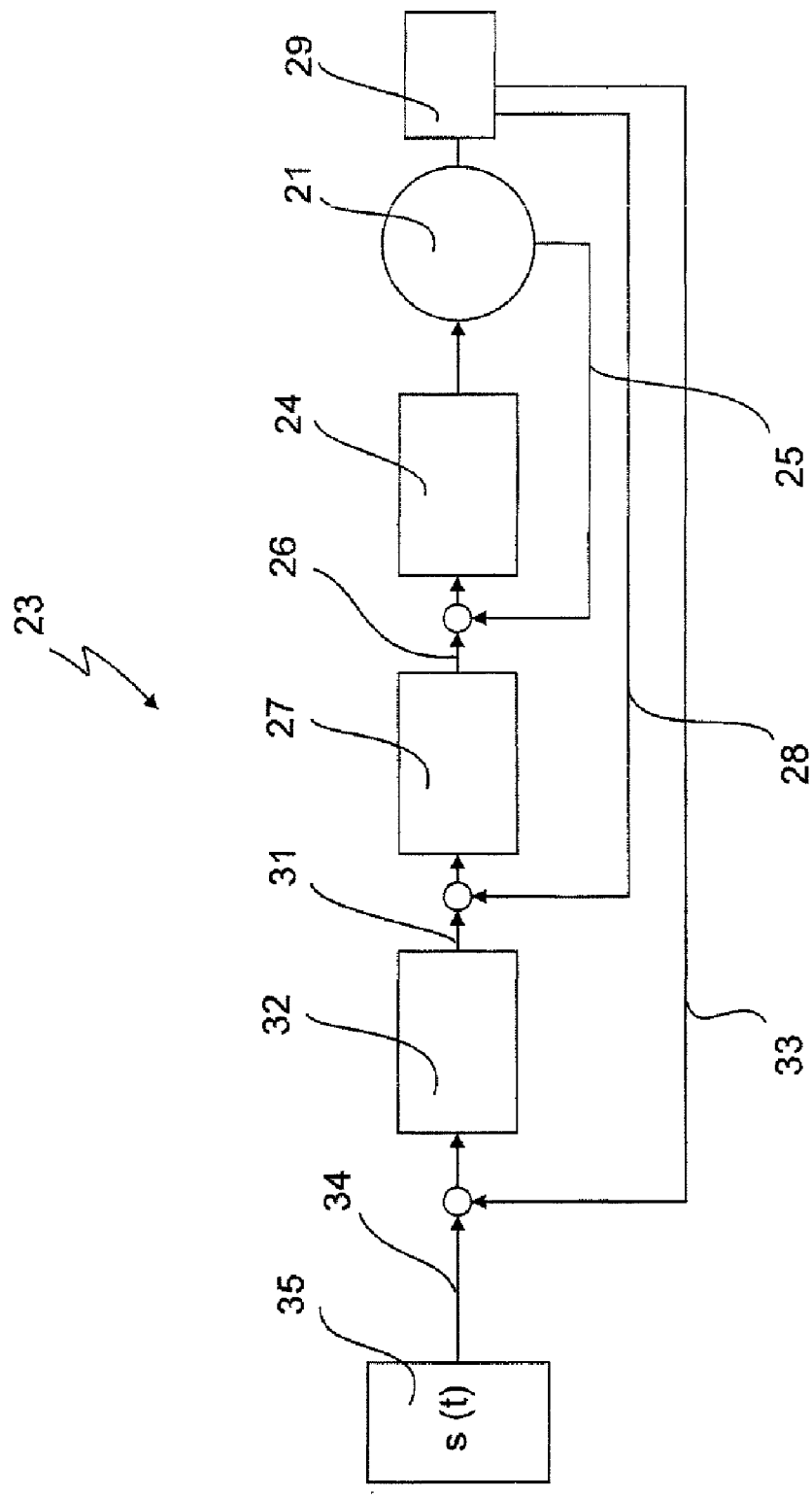
FIG. 2 shows a block diagram of the position feedback control loops for the feed axis of the machine tool from FIG. 1.

For this purpose, the motor 21 is controlled via a position feedback control loop 23, which in FIG. 2 is represented as a block diagram.

The position feedback control loop 23 comprises, as an inner feedback control loop, a current feedback controller 24, which, at its input, compares a current actual value 25 coming from the motor 21 with a current setpoint 26 supplied by a rotational-speed feedback controller 27. The rotational-speed feedback controller 27, at its input, compares a rotational-speed actual value 28, which is supplied by an encoder 29 connected to the motor 21, with a rotational-speed setpoint 31 supplied by a position feedback controller 32.

The position feedback controller 32, at its input, compares a position actual value 33, supplied by the encoder 29, with a position setpoint 34 supplied by a control system 35.

The control system 35 calculates, in dependence on the machining task and the current machining state, the respectively next position setpoint s(t) that is to be assumed by the tool 18 through movement of the spindle head 15. For this purpose, the motor 21 is controlled accordingly via the feedback controllers 24, 27 and 32.

If a linear motion is to be executed at a constant feed rate s(t), the time-dependent position setpoint $S_f(t)$ is calculated as follows:

$$S_f(t) = f*n/60*t,$$

wherein
f=feed per revolution of the tool
n=rotational speed of the tool per minute
t=time in seconds In the case of a feed of f=0.018 mm/revolution and a rotational speed of n=8000/min, there results, for example, a constant feed rate $$V_f = f*n/60$$

of 2.4 mm/sec.

In order to realize a forced chip breakage, there is additionally imparted to the feed motion s(t) further to the constant feed motion $S_f(t)$ an oscillation component a(t) that is set in such a way, for example, that, for each X revolutions of the tool, the resulting feed rate V(t) once assumes a minimum value that is greater than or equal to zero. The resulting feed motion s(t) is then obtained as $$s(t) = S_f(t) - a(t),$$

with $$a(t) = k*\sin((2\pi n\, t)/(60X)),$$

wherein n/(60X) is the oscillation frequency $f_a$, and k is a constant, the maximum value of which is defined by f and X. The length of the chips can be influenced through appropriate selection of X. If the feed f is varied in the course of machining, k is adaptively matched to the new machining condition, the oscillation frequency $f_a$ also being able to be varied, independently of the rotational speed n, through a variation of X.

In this case, the oscillation stroke of the tool determined by k is not to be greater, at any instant, than the feed being effected without a superimposed oscillation component. It is then ensured that the tool does not disengage from the chip.

In the average over time, this oscillation component a(t) consequently is not instrumental in the overall feed, but it results in the feed motion being periodically accelerated and decelerated again. Experiments by the applicant have shown that the control system and the drive system, i.e. in particular the position feedback control loop 23 and the motor 21, fulfill these requirements, even in sustained operation.

If the feed is to periodically become zero, for example, the feed rate applicable to the oscillation component $V_a$ is $$V_a = V_f*\sin((2\pi n\, t)/(60X))$$

and consequently $$V(t) = V_f - V_a = V_f*(1 - \sin((2\pi n\, t)/(60X)))$$

The feed rate V(t) thus fluctuates sinusoidally between zero and a maximum value $$V_{max} = 2*V_f$$

In the average over time, the feed continues to be effected at $V_f$.

Figure 3:
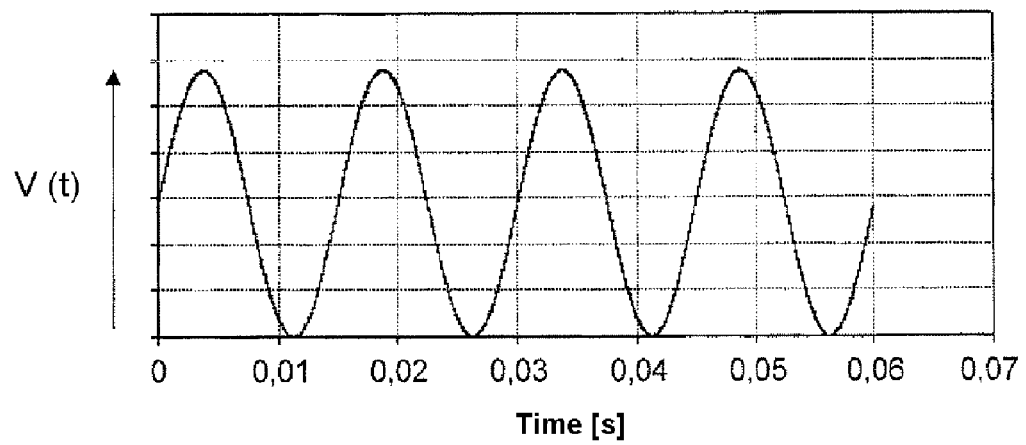
FIG. 3 shows schematic diagrams in arbitrary units, the variation of the resulting feed rate V(t) over time being represented at the top, and the variation of the feed motion s(t) over time being represented at the bottom.
Figure 3:
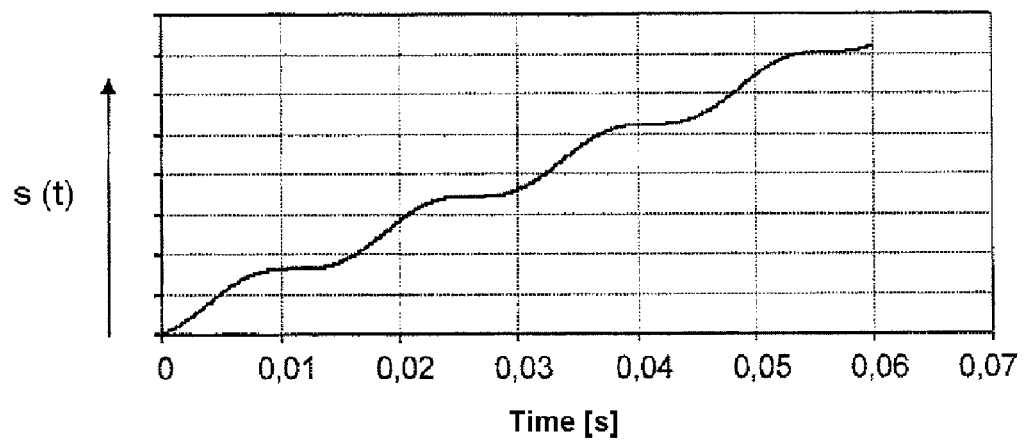

Shown in principle in FIG. 3, at the top, is the variation of the resulting feed rate V(t) over time and, at the bottom, the variation of the resulting feed s(t) over time.

It can be seen that the feed rate V(t) periodically becomes very low or even zero, which results in no feed, or almost no feed, being effected, and there is consequently a periodic thinning of the chip, which thereby becomes rippled, which results in a forced chip breakage.

Experiments by the applicant have shown that an oscillation frequency $f_a$ of up to 70 Hz and an oscillation stroke k of 0.02 mm can be realized, the rotational speed n and the feed f being able to be varied within wide ranges, independently thereof.

A chip breakage produced in a stable manner is then obtained for X=2 to 5. Since the excitation of oscillations a(t) lies within the small-signal range, the dynamic demands on the ball screw 22 are also within the permissible range.

With use of this method, it was possible to machine, with reliable chip breakage, even material which are not easily to cut i.e. from which chips are not easily removed, or material producing long chips.

The values stated here for f and n are to be understood as merely exemplary, the new method also working with the required reliability and long-term stability in the case of higher or lower feed rates and tool rotational speeds.

Therefore, what is claimed, is:

1. A method for machining workpieces on a cutting machine tool, in which method a tool is put into rotation relative to said workpiece and the tool is moved relative to the workpiece with a feed motion, the tool executing an oscillating motion in the direction of the feed motion relative to the workpiece,
whereby a settable oscillation component is imparted to the feed motion via control means.

2. The method of claim 1, wherein said oscillation component comprises an oscillation stroke that is set in dependence on the feed of the tool.

3. The method of claim 2, wherein said oscillation stroke is set independently of a rotational speed of the tool.

4. The method of claim 1, wherein said oscillation component comprises an oscillation frequency that is set independently of a rotational speed (n) of the tool.

5. The method of claim 1, wherein said oscillation component is set such that the feed motion always remains greater than or equal to zero.

6. The method of claim 1, wherein a predefined continuous waveform is imparted to the oscillation component of the feed motion by using control means.

7. The method of claim 6, wherein said predefined continuous waveform is a sinusoidal waveform.

8. The method of claim 1, wherein said oscillation component is adaptively matched to the current profile of the machining.

9. The method of claim 1, which is performed on a CNC-controlled machine tool, in which machine tool said tool is clamped into a work spindle and the workpiece is clamped into a device, the work spindle and the device being moved relative to one another in a program-controlled manner, at least in the direction of the feed motion.

10. The method of claim 5, which is performed on a CNC-controlled machine tool, in which machine tool said tool is clamped into a work spindle and the workpiece is clamped into a device, the work spindle and the device being moved relative to one another in a program-controlled manner, at least in the direction of the feed motion.

11. The method of claim 1, wherein bores are drilled into workpieces, and said oscillation stroke is set in dependence on the feed of the tool.

12. The method of claim 10, wherein bores are drilled into workpieces, and said oscillation stroke is set in dependence on the feed of the tool.

13. A method for machining workpieces on a cutting machine tool, comprising the step of drilling bores into said workpieces, in which method a tool is put into rotation relative to said workpiece and the tool is moved relative to the workpiece with a feed motion, the tool executing an oscillating motion in the direction of the feed motion relative to the workpiece, whereby a settable oscillation component is imparted to the feed motion via control means, and wherein said oscillation component comprises an oscillation stroke that is set in dependence on the feed of the tool.

14. The method of claim 13, wherein said oscillation stroke is set independently of a rotational speed of the tool.

15. The method of claim 14, wherein said oscillation component comprises an oscillation frequency that is set independently of a rotational speed (n) of the tool.

16. The method of claim 13, wherein said oscillation component is set such that the feed motion always remains greater than or equal to zero.

* * * * *